(12) United States Patent
Willard

(10) Patent No.: US 6,695,386 B1
(45) Date of Patent: Feb. 24, 2004

(54) VEHICLE RETRACTABLE HARDTOP ROOF

(75) Inventor: Michael T. Willard, Harrison Township, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/245,973

(22) Filed: Sep. 18, 2002

(51) Int. Cl.⁷ .................................................. B60J 7/08
(52) U.S. Cl. ............................. 296/107.17; 296/107.01; 296/107.08; 296/107.16; 296/108
(58) Field of Search .................. 296/107.01, 107.07, 296/107.09, 107.08, 107.16, 107.17, 108

(56) References Cited

U.S. PATENT DOCUMENTS

| | | | |
|---|---|---|---|
| 404,405 A | 6/1889 | Haughey |
| 1,184,734 A | 5/1916 | Freeman |
| 1,784,279 A | 12/1930 | Ellerbeck |
| 1,988,346 A | 1/1935 | Wagner |
| 2,007,873 A | 7/1935 | Paulin |
| 2,076,243 A | 4/1937 | Marshall et al. |
| 2,303,789 A | 12/1942 | Carr |
| 2,564,446 A | 8/1951 | Parsons |
| 2,580,486 A | 1/1952 | Vigmostad |
| 2,596,355 A | 5/1952 | Ackermans |
| 2,704,225 A | 3/1955 | Anschuetz et al. |
| 2,747,928 A | 5/1956 | Olivier et al. |
| 2,768,024 A | 10/1956 | Spear, Jr. |
| 2,768,025 A | 10/1956 | Spear, Jr. et al. |
| 2,841,441 A | 7/1958 | Evans |
| 2,856,231 A | 10/1958 | Zeman |
| 2,869,923 A | 1/1959 | Mulichak |
| 2,919,156 A | 12/1959 | Dodge |
| 2,939,742 A | 6/1960 | Dardarian et al. |
| 2,997,337 A | 8/1961 | Day et al. |
| 3,059,962 A | 10/1962 | Harms et al. |
| 3,154,341 A | 10/1964 | Booth |
| 3,172,695 A | 3/1965 | Bordinat, Jr. |
| 3,357,738 A | 12/1967 | Bourlier |
| 3,375,037 A | 3/1968 | Hunt, Jr. |
| 3,377,099 A | 4/1968 | Podolan |
| 3,575,464 A | 4/1971 | Himka et al. |
| 3,994,524 A | 11/1976 | Lehmann |
| 4,168,859 A | 9/1979 | Breitschwerdt et al. |
| 4,573,732 A | 3/1986 | Muscat |
| 4,634,171 A | 1/1987 | McKeag |
| 4,711,485 A | 12/1987 | Maebayashi et al. |
| 4,712,828 A | 12/1987 | Albrecht |
| 4,729,592 A | 3/1988 | Tuchiya et al. |
| 4,746,163 A | 5/1988 | Muscat |
| 4,796,943 A | 1/1989 | Fukutomi et al. |

(List continued on next page.)

FOREIGN PATENT DOCUMENTS

| | | |
|---|---|---|
| BE | 493260 | 5/1950 |
| CH | 650980 | 8/1985 |
| DE | 646381 | 5/1937 |

(List continued on next page.)

OTHER PUBLICATIONS

U.S. patent application Ser. No. 09/779,425, Willard, filed Feb. 8, 2001.

(List continued on next page.)

*Primary Examiner*—Dennis H. Pedder
*Assistant Examiner*—Lori L Coletta
(74) *Attorney, Agent, or Firm*—Harness, Dickey & Pierce, P.L.C.

(57) ABSTRACT

A convertible roof for an automotive vehicle is provided. In one aspect of the present invention, a convertible roof includes first, second and third roof sections. At least one of the roof sections rotates over one hundred and eighty degrees when moving from a raised position to a stowed position. Another aspect of the present invention employs a balance link interconnecting the second roof section and the vehicle. Another aspect of the present invention provides that a substantial portion of one of the roof sections is positioned below a top of a vehicle wheel well.

20 Claims, 6 Drawing Sheets

U.S. PATENT DOCUMENTS

| | | |
|---|---|---|
| 4,852,935 A | 8/1989 | Varner |
| 4,854,634 A | 8/1989 | Shiraishi et al. |
| 4,895,409 A | 1/1990 | Konishi et al. |
| 4,950,022 A | 8/1990 | Pattee |
| 4,958,882 A | 9/1990 | Kolb |
| 5,029,932 A | 7/1991 | Parr |
| 5,033,789 A | 7/1991 | Hayashi et al. |
| 5,035,461 A | 7/1991 | Zweigart |
| 5,067,768 A | 11/1991 | Fischbach |
| 5,078,447 A | 1/1992 | Klein et al. |
| 5,090,764 A | 2/1992 | Kogawa et al. |
| 5,161,852 A | 11/1992 | Alexander et al. |
| 5,195,798 A | 3/1993 | Klein et al. |
| 5,207,474 A | 5/1993 | Licher et al. |
| 5,209,544 A | 5/1993 | Benedetto et al. |
| 5,225,747 A | 7/1993 | Helms et al. |
| 5,429,409 A | 7/1995 | Corder et al. |
| 5,451,849 A | 9/1995 | Porter et al. |
| 5,490,709 A | 2/1996 | Rahn |
| 5,520,432 A | 5/1996 | Gmeiner et al. |
| 5,533,777 A | 7/1996 | Kleemann et al. |
| 5,542,735 A | 8/1996 | Fürst et al. |
| 5,593,202 A | 1/1997 | Corder et al. |
| 5,743,587 A | 4/1998 | Alexander et al. |
| 5,769,483 A | 6/1998 | Danzl et al. |
| 5,772,274 A | 6/1998 | Tokarz |
| 5,772,275 A | 6/1998 | Tokarz |
| 5,785,375 A | 7/1998 | Alexander et al. |
| 5,806,912 A | 9/1998 | Ramaciotti et al. |
| D406,792 S | 3/1999 | Alexander et al. |
| 5,975,620 A | 11/1999 | Jambor et al. |
| 5,979,970 A | 11/1999 | Rothe et al. |
| 5,988,729 A * | 11/1999 | Klein .................... 296/107.15 |
| 6,007,143 A | 12/1999 | Lehmann et al. |
| 6,010,178 A | 1/2000 | Hahn et al. |
| 6,019,416 A | 2/2000 | Beierl |
| 6,030,023 A | 2/2000 | Guillez |
| 6,033,008 A | 3/2000 | Mattila |
| 6,033,009 A | 3/2000 | Ritter et al. |
| 6,039,382 A | 3/2000 | Mather et al. |
| 6,039,383 A | 3/2000 | Jambor et al. |
| 6,053,560 A | 4/2000 | Rothe |
| 6,062,625 A * | 5/2000 | Elelnrieder et al. ......... 296/108 |
| D427,138 S | 6/2000 | Alexander et al. |
| 6,168,224 B1 | 1/2001 | Henn et al. |
| 6,217,104 B1 | 4/2001 | Neubrand |
| D442,541 S | 5/2001 | Alexander et al. |
| 6,273,492 B1 | 8/2001 | Schroder et al. |
| 6,283,532 B1 | 9/2001 | Neubrand |
| 6,299,234 B1 | 10/2001 | Seel et al. |
| 6,312,041 B1 | 11/2001 | Queveau et al. |
| 6,312,042 B1 | 11/2001 | Halbweiss et al. |
| 6,315,349 B1 | 11/2001 | Kinnanen |
| 6,318,793 B1 | 11/2001 | Rapin et al. |
| 6,325,446 B1 | 12/2001 | Wuellrich et al. |
| 6,328,372 B1 | 12/2001 | Just |
| 6,334,644 B1 | 1/2002 | Gurtler et al. |
| 6,336,673 B1 * | 1/2002 | Rothe et al. ............ 296/107.17 |
| 6,347,828 B1 | 2/2002 | Rapin et al. |
| 6,390,532 B1 | 5/2002 | Mac Farland |
| 6,502,891 B2 | 1/2003 | Russke |
| 6,505,881 B2 * | 1/2003 | Kinnanen ............... 296/107.17 |
| 6,572,175 B2 * | 6/2003 | Schütt et al. ................ 296/108 |
| 6,592,169 B2 * | 7/2003 | Obendick ............... 209/107.07 |
| 2001/0006297 A1 | 7/2001 | Dintner et al. |
| 2001/0019213 A1 | 9/2001 | Eberle |
| 2001/0020793 A1 | 9/2001 | Eberle |
| 2001/0024050 A1 * | 9/2001 | Schutte t al. .......... 296/107.08 |
| 2001/0045749 A1 * | 11/2001 | Russke .................. 296/107.17 |
| 2002/0185886 A1 | 12/2002 | Obendiek |
| 2003/0042751 A1 * | 3/2003 | Antreich ................ 296/107.17 |
| 2003/0057727 A1 * | 3/2003 | Tohda et al. ........... 296/107.01 |
| 2003/0080579 A1 * | 5/2003 | Reinsch ................. 296/107.17 |
| 2003/0085587 A1 * | 5/2003 | Reinsch ................. 296/107.17 |

FOREIGN PATENT DOCUMENTS

| | | |
|---|---|---|
| DE | 1 505 474 | 7/1969 |
| DE | 3416286 A1 | 10/1984 |
| DE | 3635373 A1 | 4/1988 |
| DE | 3635887 A1 | 5/1988 |
| DE | 3733892 A | 4/1989 |
| DE | 3816060 A | 11/1989 |
| DE | 9108242 | 12/1992 |
| DE | 4316485 A1 | 11/1994 |
| DE | 4320603 A1 | 1/1995 |
| DE | 4324708 A1 | 1/1995 |
| DE | 4438191 C1 | 7/1995 |
| DE | 4438190 C1 | 11/1995 |
| DE | 4431656 C1 | 12/1995 |
| DE | 4445580 C1 | 12/1995 |
| DE | 4445941 C1 | 3/1996 |
| DE | 4445944 C1 | 4/1996 |
| DE | 4446483 A1 | 6/1996 |
| DE | 19517063 C1 | 6/1996 |
| DE | 4445920 A1 | 7/1996 |
| DE | 19514022 C1 | 9/1996 |
| DE | 19518071 A1 | 11/1996 |
| DE | 19532568 C1 | 11/1996 |
| DE | 19532567 C1 | 12/1996 |
| EP | 0261379 A2 | 4/1987 |
| EP | 0494366 A2 | 7/1992 |
| FR | 1049026 | 12/1953 |
| FR | 2 818 931 | 7/2002 |
| GB | 413467 | 7/1934 |
| GB | 756531 | 9/1956 |
| GB | 978638 | 12/1964 |
| JP | 62-120222 | 6/1987 |
| JP | 2-51925 | 4/1990 |
| JP | 2-144226 | 4/1990 |

OTHER PUBLICATIONS

U.S. patent application Ser. No. 09/930,564, Willard, field Aug. 15, 2001.

U.S. patent application Ser. No. 09/930,739, Willard, field Aug. 15, 2001.

U.S. patent application Ser. No. 10/246,114, Grubbs, filed Sep. 18, 2002.

U.S. patent application Ser. No. 60/403,691, Eichhorst et al., filed Aug. 15, 2002.

Picture of a 1957 Ford Fairlane retractable hardtop convertible, The Detroit New, Apr. 6, 1994.

Viper Pure Performance By Dodge/Auto Editors of Consumder Guide, Publications International, Ltd. pp. 6 and 7, 1993.

Automotive Industries, Feb. 1990, p. 75, showing "C & C Intrigue".

Automobil Revue, Sep. 5, 1991, cover page and p. 29 (including English translation).

Car Styling 86, Jan. 1992, cover page and pp. 64–67 (including English translation).

Introducing the Chevy SSR, Aug., 2000, 2 pages (and description of corresponding public use).

Alfa Romeo Proteo Or Alfa Romeo 164 Proteo / 1991 (believed to have been offered for sale, publicly used, and/or published prior to the filing date of this application).

Alfa Romeo Spider Rht / 2001 (believed to have been offered for sale, publicly used, and/or published prior to the filing date of this application).
Audi Quattro Roadster / 1984–1987 (believed to have been offered for sale, publicly used, and/or published prior to the filing date of this application).
Bently Retractable Hardtop / 1999 (beleived to have been offered for sale, publicly used, and/or published prior to the filing date of this application).
Bérard Roadster / 2001 (believed to have been offered for sale, publicly used, and/or published prior to the filing date of this application).
BMW Klapp Top / 2000 (believed to have been offered for sale, publicly used, and/or published prior to the filing date of this application).
BMW Oasys Vision / 2002 (believed to have been offered for sale, publicly used, and/or published prior to the filing date of this application).
Buick Blackhawk / 2000 (believed to have been offered for sale, publicly used, and/or published prior to the filing date of this application).
Cadillac Allanté Charisma / 1994 (believed to have been offered for sale, publicly used, and/or published prior to the filing date of this application).
Cadillac Evoq / 1999 (believed to have been offered for sale, publicly used, and/or published prior to the filing date of this application).
Cadillac XLR / 2003–200x (believed to have been offered for sale, publicly used, and/or published prior to the filing date of this application).
C&C Intrigue / 1990 (believed to have been offered for sale, publicly used, and/or published prior to the filing date of this application).
Chevrolet SSR / 2000 (believed to have been offered for sale, publicly used, and/or published prior to the filing date of this application).
Chevrolet SSR / 2001–200x (believed to have been offered-for sale, publicly used, and/or published prior to the filing date of this application).
Chevrolet Corvette Retractable Hardtop / 1958 (believed to have been offered for sale, publicly used, and/or published prior to the filing date of this application).
Chrysler Thunderbolt / 1941 (believed to have been offered for sale, publicly used, and/or published prior to the filing date of this application).
Chrysler Dart / 1957 (believed to have been offered for sale, publicly used, and/or published prior to the filing date of this application).
Chrysler Phaeton / 1997 (believed to have been offered for sale, publicly used, and/or published prior to the filing of this application).
Citroën 15 Six / 1950 (believed to have been offered for sale, publicly used , and/or published prior to the filing date of this application).
Citroën 11 Légère / 1952 (believed to have been offered for sale, publicly used, and/or published prior to the filing date of this application).
Daihatsu Kopen / 1999 (believed to have been offered for sale, publicly used, and/or published prior to the filing date of this application).
Daihatsu Kopen / 2001 (believed to have been offered for sale, publicly used, and/or published prior to the filing date of this application).
Edsel Retractable Hardtop / 1958 (believed to have been offered for sale, publicly used, and/or published prior to the filing date of this application).
Edsel Skyliner / 1958 (believed to have been offered for sale, publicly used, and/or published prior to the filing date of this application).
Ferrari Testarossa St. Tropez / 1992 (believed to have been offered for sale, publicly used, and/or published prior to the filing date of this application).
Fiat Punto Wish / 1999 (believed to have been offered for sale, publicly used, and/or published prior to the filing date of this application).
Ford Fairlane 500 Skyliner / 1957 (believed to have been offered for sale, publicly used, and/or published prior to the filing date of this application).
Ford Fairlane 500 Skyliner / 1958 (believed to have been offered for sale, publicly used, and/or published prior to the filing date of this application).
Ford Galaxie Skyliner / 1959 (believed to have been offered for sale, publicly used, and/or published prior to the filing date of this application).
Ford Mustang Restro–mod / 1964 (believed to have been offered for sale, publicly used, and/or published prior to the filing date of this application).
Ford Mustang Retractable Hardtop / 1964 (believed to have been offered for sale, publicly used, and/or published prior to the filing date of this application).
Ford Mustang Retractable Hardtop / 1966 (believed to have been offered for sale, publicly used, and/or published prior to the filing date of this application).
Ford Focus Cabriolet Reteractable Hardtop / 1999 (believed to have been offered for sale, publicly used, and/or published prior to the filing date of this application).
Gaylord Gladiator / 1955–1956 (believed to have been offered for sale, publicly used, and/or published prior to the filing date of this application).
Heuliez Raffica / 1992 (believed to have been offered for sale, publicly used, and/or published prior to the filing date of this application).
Heuliez Hardtop Intruder / 1998 (believed to have been offered for sale, publicly used, and/or published prior to the filing date of this application).
Heuliez Retractop 2 / 2000 (believed to have been offered for sale, publicly used, and/or published prior to the filing date of this application).
Heuliez Retractop 10 / 2001 (believed to have been offered for sale, publicly used, and/or published prior to the filing date of this application).
Honda Argento Vivo / 1995 (believed to have been offered for sale, publicly used, and/or published prior to the filing date of this application).
Hudson Super Six / 1922 (believed to have been offered for sale, publicly used, and/or published prior to the filing date of this application).
Hudson Super Six / 1923 (believed to have been offered for sale, publicly used, and/or published prior to the filing date of this application).
Isuzu VX–02 / 1999 (believed to have been offerd for sale, publicly used, and/or published prior to thr filing date of this application).
Karmann Coupé–Cabrio / 1999 (believed to have been offered for sale, publicly used, and/or published prior to the filing date of this application).

Keinath GT/R / 1996–200x (believed to have been offered for sale, publicly used, and/or published prior to the filing date of this application).

Lada Roadster / 2000 (believed to have been offered for sale, publicly used, and/or published prior to the filing date of this application).

Lancia Belna Éclipse / 1934 (believed to have been offered for sale, publicly used, and/or published prior to the filing date of this application).

Lexus Sport Coupé / 1999 (believed to have been offered for sale, publicly used, and/or published prior to the filing date of this application).

Lexus SC430 / 2000–200x (believed to have been offered for sale, publicly used, and/or published prior to the filing date of this application).

Mercedes–Benz Magic Top / 1984–1987 (believed to have been offered for sale, publicly used, and/or published prior to the filing date of this application).

Mercedes–Benz SLK Paris / 1994 (believed to have been offered for sale, publicly used, and/or published prior to the filing date of this application).

Mercedes–Benz SLK/ 1996–200x (believed to have been offered for sale, publicly used, and/or published prior to the filing date of this application).

Mercedes–Benz GLK / 1999 (believed to have been offered for sale, publicly used, and/or published prior to the filing date of this application).

Mercedes–Benz SL / 2001–200x (believed to have been offered for sale, publicly used, and/or published prior to the filing date of this application).

Michalak Corsaspider / 1984–1988 (believed to have been offered for sale, publicly used, and/or published prior to the filing date of this application).

Mitsubishi Colt Aiolia / 1988 (believed to have been offered for sale, publicly used, and/or published, prior to the filing date of this application).

Mitsubishi 3000 GT Spyder / 1994–1996 (believed to have been offered for sale, publicly used, and/or published prior to the filing date of this application).

Mohs Safarikar / 1972–1975 (believe to have been offered for sale, publicly used, and/or published prior to the filing date of this application).

Nissan Luc–2 / 1985 (believed to have been offered for sale, publicly used, and/or published prior to the filing date of this application).

Nissan 3000 ZX / 1992 (believed to have been offered for sale, publicly used, and/or published prior to the filing date of this application).

Nissan Silvia Varietta / 1999 (believed to have been offered for sale, publicly used, and/or published prior to the filing date of this application).

Oldsmobile F–88 MK3 / 1959 (believed to have been offered for sale, publicly used, and/or published prior to the filing date of this application).

Paxton / 1951 (believed to have been offered for sale, publicly used, and/or published prior to the filing date of this application).

Peugeot 301 Éclipse / 1934 (beleived to have been offered for sale, publicly used, and/or published prior to the filing date of this application).

Peugeot 601c Éclipse / 1934 (believed to have been offered for sale, publicly used, and/or published prior to the filing date of this application).

Peugeot 601 dl Éclipse / 1934 (believed to have been offered for sale, publicly used, and/or published prior to the filing date of this application).

Peugeot 401d Éclipse / 1934–1935 (believed to have been offered for sale, publicly used, and/or published prior to the filing date of this application).

Peugeot 601d Éclipse / 1934–1935 (believed to have been offered for sale, publicly used, and/or published prior to the filing date of this application).

Peugeot 402 Éclipse Électrique / 1935–1936 (believed to have been offered for sale, publicly used, and/or published prior to the filing date of this application).

Peugeot 402 Éclipse Mécanique / 1936–1938 (believed to have been offered for sale, publicly used, and/or published prior to the filing date of this application).

Peugeot 202 Éclipse / 1938 (believed to have been offered for sale, publicly used, and/or published prior to the filing date of this application).

Peugeot 402b Éclipse Mécanique / 1938–1939 (believed to have been offered for sale, publicly used, and/or published prior to the filing date of this application).

Peugeot 106 Spider / 1992 (believed to ahve been offered for sale, publicly used, and/or published prior to the filing date of this application).

Peugeot 20■/ 1998 (believed to have been offered for sale, publicly used, and/or published prior to the filing date of this application).

Peugeot Crisalys / 1998 (believed to have been offered for sale, publicly used, and/or published prior to the filing date of this application).

Peugeot 607 Paladine / 2000 (believed to have been offered for sale, publicly used, and/or published prior to the filing date of this application).

Peugeot 206 CC / 2000–200x (believed to have been offered for sale, publicly used, and/or published prior to the filing date of this application).

Peugeot 206 CC Ciel Bleu / 2001 (believed to have been offered for sale, publicly used, and/or published prior to the filing date of this application).

Peugeot 3■7 CC / 2002 (believed to have been offered for sale, publicly used, and/or published prior to the diling date of this application).

Playboy / 1947–1951 (believed to have been offered for sale, publicly used, and/or published prior to the filing date of this application).

Scimitar Hard–Top Convertible / 1959 (believed to have been offered for sale, publicly used, and/or published prior to the filing date of this application).

Skyline X–50 / 1953 (believed to have been offered for sale, publicly used, and/or published prior to the filing date of this application).

Suzuki C2 / 1997 (believed to have been offered for sale, publicly used, and/or publsihed prior to the filing date of this application).

Toyota MRJ / 1995 (believed to have been offered for sale, publicly used, and/or published prior to the filing date of this application).

Toyota Soarer / 2000–200x (believed to have been offered for sale, publicly used, and/or published prior to the filing date of this application).

Treser T1 / 1987–198x (believed to have been offered for sale, publicly used, and/or published prior to the filing date of this application).

Valmet Boreal / 1997 (believed to have been ofered for sale, publicly used, and/or publsihed prior to the filing date of this application).

Volvo C70 Hatric / 2001 (believed to have been offered for sale, publicly used, and/or published prior to the filing date of this application).

Volvo C70 Coupé Convertible / 2002 (believed to have been offered for sale, publicly used, and/or published prior to the filing date of this application).

Volvo Lowrider / 19xx (believed to have been offered for sale, publicly used, and/or published prior to the filing date of this application).

* cited by examiner

VEHICLE RETRACTABLE HARDTOP ROOF

BACKGROUND AND SUMMARY OF THE INVENTION

This invention relates generally to convertible roof structures for automotive vehicles and, more particularly, to a multi-part hard top convertible roof.

Retractable roofs for convertible automotive vehicles presently exist. Examples of traditional hard-top convertible roofs are disclosed in the following patents: U.S. Pat. No. 6,347,828 entitled "Actuation Mechanism for a Two Piece Retractable Hard-Top Roof for an Automobile" which issued to Rapin et al. on Feb. 19, 2002; U.S. Pat. No. 6,318,793 entitled "Two Piece Retractable Hard-Top Roof for an Automobile" which issued to Rapin et al. on Nov. 20, 2001; U.S. Pat. No. 5,979,970 entitled "Roof Assembly for a Convertible Vehicle" which issued to Rothe et al. on Nov. 9, 1999; U.S. Pat. No. 5,785,375 entitled "Retractable Hard-Top for an Automotive Vehicle" which issued to Alexander et al. on Jul. 28, 1998; U.S. Pat. No. 5,769,483 entitled "Convertible Motor Vehicle Roof" which issued to Danzl et al. on Jun. 23, 1998; U.S. Pat. No. 5,743,587 entitled "Apparatus for Use in an Automotive Vehicle having a Convertible Roof System" which issued to Alexander et al. on Apr. 28, 1998; and EPO Patent Publication No. 1 092 580 A1 which was published on Apr. 18, 2001. The U.S. patents are incorporated by reference herein.

In another example, one retractable hard top roof employs a plurality of rigid roof panels which slide rearwardly over one another during retraction. Typically, these retracting roof panels are mechanically stowed in the trunk of the automotive vehicle. Unfortunately, this system does not fully retract flush within the vehicle body and occupies a relatively large storage space within the trunk.

Recently, various retractable roof systems have been developed with a rigid roof member which swings into a passenger compartment of the vehicle. These systems stow the retracted roof panels in a substantially vertical orientation behind either the front or rear seats. While these systems maintain storage space within the trunk, the retracted roof panels are often stored in an unsightly manner. Additionally, the vertical orientation of the retracted roof panels requires a relatively deep storage compartment. This orientation often precludes use of a retractable roof in vehicles having a usable cargo area such as sport utility vehicles and pick-up trucks. Therefore, it would be desirable to have a retractable hard top roof requiring a minimal packaging envelope to maximize storage space within the trunk or cargo area. To achieve this goal, multiple panels are stored in a substantially horizontal manner to minimize the depth of the required storage area.

In accordance with the present invention, a hard top roof system includes at least three separate and generally rigid sections interconnected to one another to selectively cover the passenger compartment of a vehicle. In another aspect of the present invention, as the roof system is retracted, a rearward roof section articulates more than one hundred and eighty degrees when moving from a raised position to a stowed position. In a further aspect of the present invention, when the roof system is fully retracted, a substantial portion of one of the roof sections is positioned below the top of the vehicle wheel well.

The present invention is advantageous over traditional designs in that the roof panels are stacked in a horizontal manner which minimizes the packaging space required in both the fore-and-aft direction and the vertical direction. Furthermore, the present invention is advantageous because the roof sections may be retracted and stowed within the vehicle's trunk so as to maintain the space within the vehicle passenger compartment. The convertible roof of the present invention may also be stowed in a roof storage compartment separated from the passenger compartment and a miscellaneous storage area or trunk.

The present invention also provides a self-covering feature in that when the convertible roof is in the stowed position, the uppermost stacked panel is oriented to display the outer finished surface of the panel. Additionally, the present invention is advantageous because the retracting mechanism is compact and lightweight. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The present invention is described for illustration purposes embodied in a hydro-mechanically actuated three-piece convertible roof for an automotive vehicle. It will be appreciated, however, that the principles of the present invention are readily adaptable to a number of other devices which can retract or deploy a multi-section roof top in a vehicle including a soft top, or flexible fabric covered roof where the actuator or retraction mechanisms are coupled to side rails, or any combined hard and soft top roof.

Figure 1:
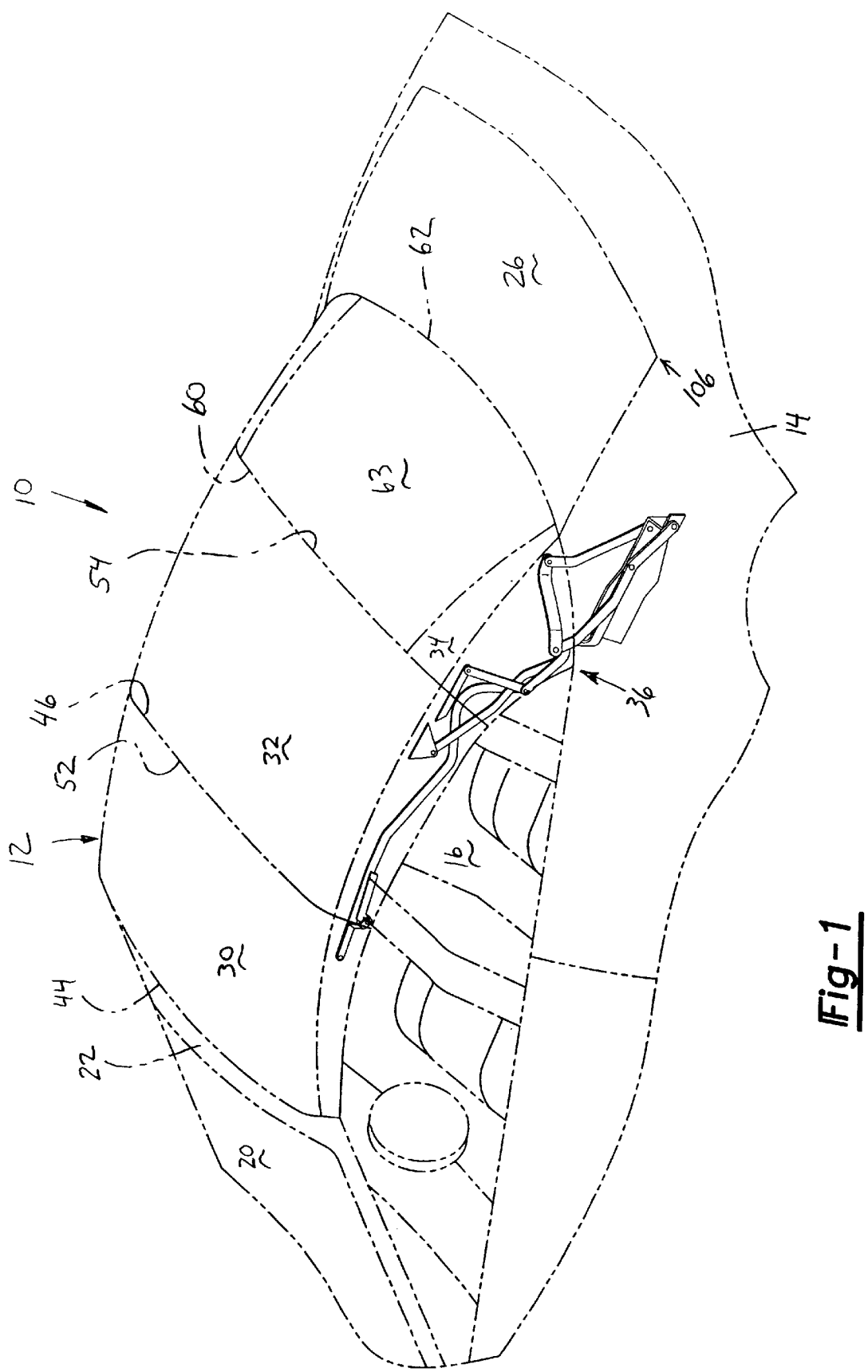
FIG. 1 is a partial perspective view of a convertible roof of the present invention in a raised position.
Figure 2:
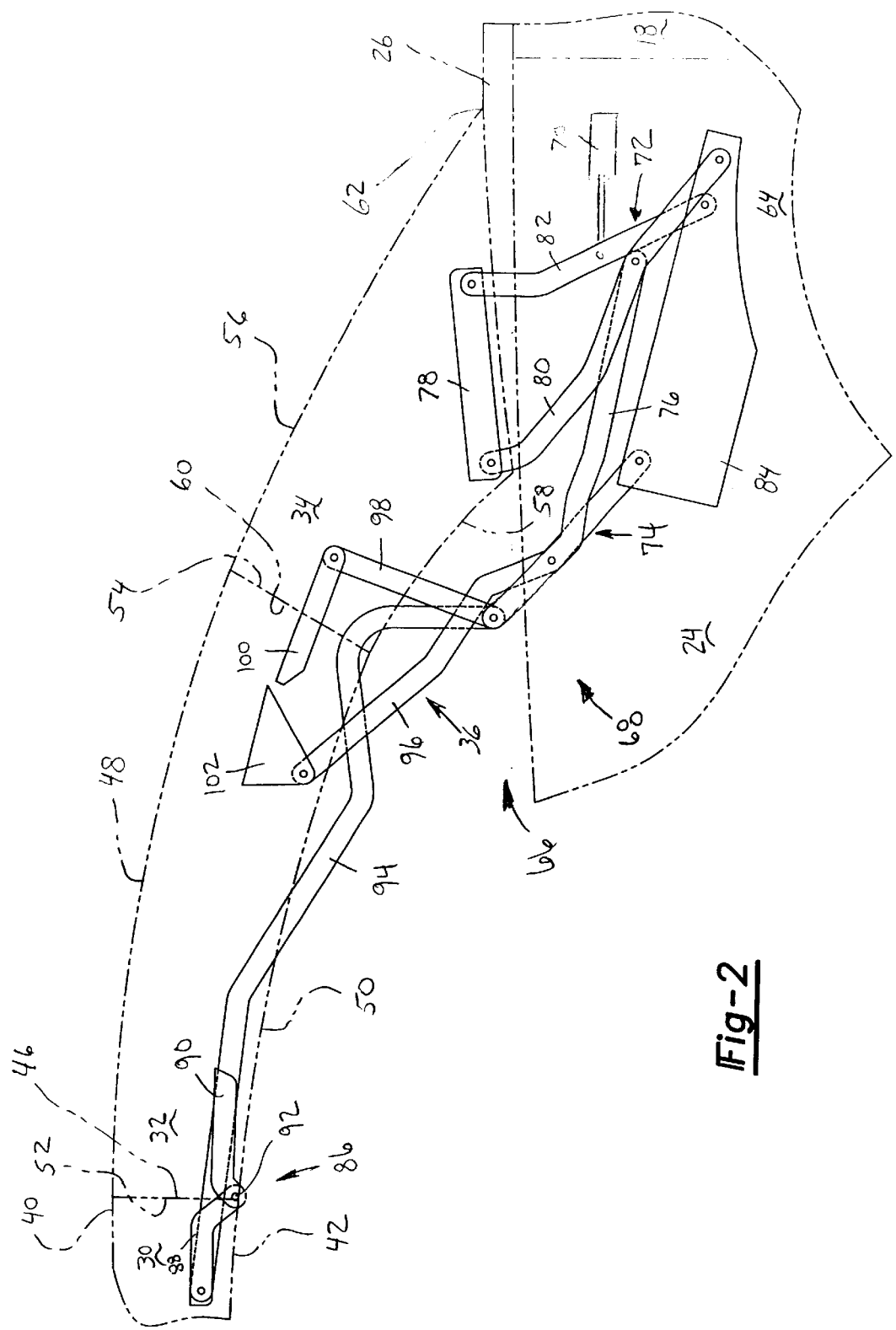
FIG. 2 is a partial side elevational view of the convertible roof of the present invention in the raised position.
Figure 3:
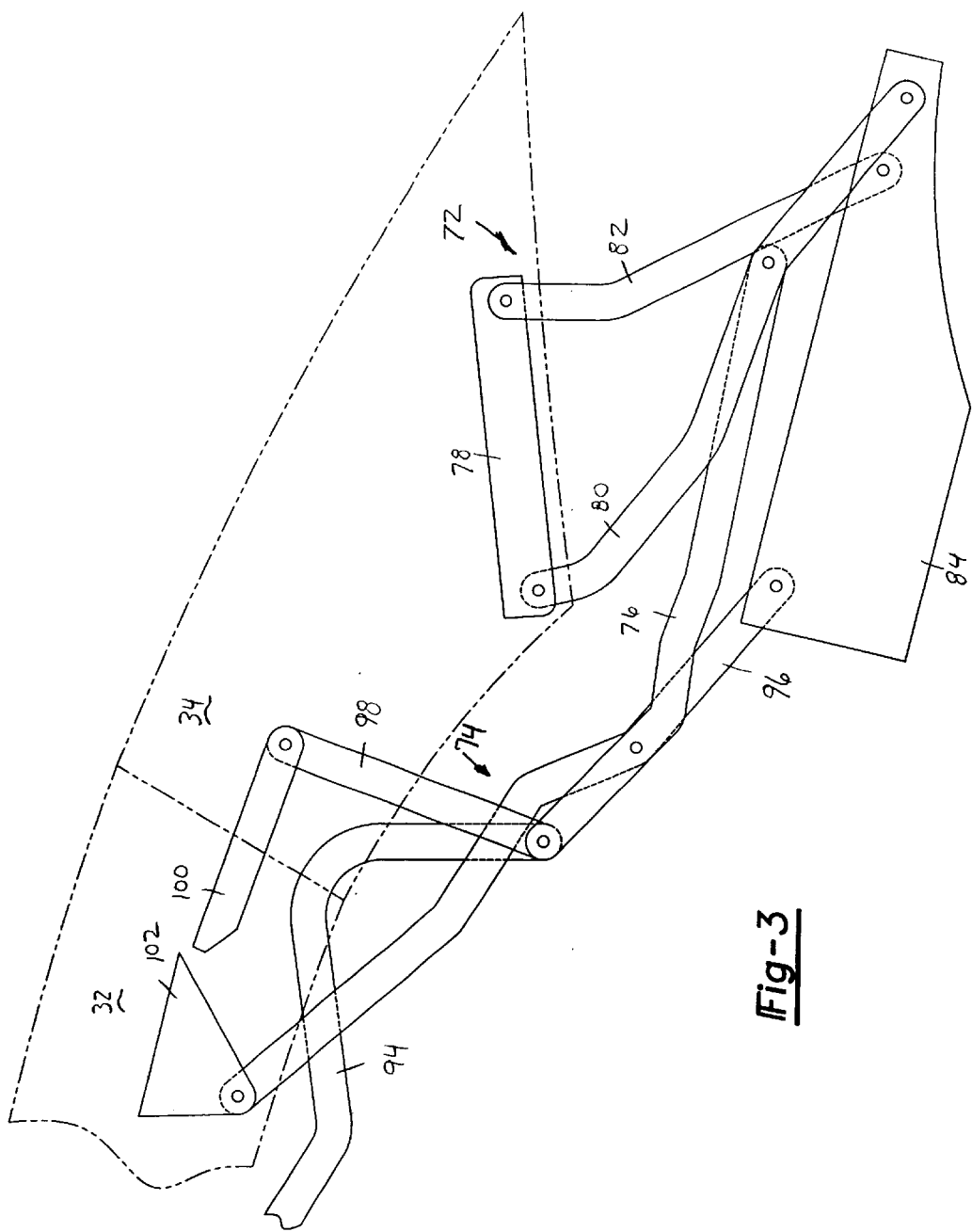
FIG. 3 is a partial enlarged side elevational view of a portion of the convertible roof of the present invention.

With reference to FIGS. 1–3, an exemplary automotive vehicle 10 includes a convertible roof 12 constructed in accordance with the teachings of the present invention. Vehicle 10 is constructed with a body 14 having a passenger compartment 16 and a miscellaneous storage area or cargo bed 18. Passenger compartment 16 includes a windshield 20 and a header 22. Header 22 spans transversely across the top of windshield 20. A roof storage compartment or area 24 is located between passenger compartment 16 and miscellaneous storage area 18. A tonneau cover 26 is pivotally coupled to body 14 to selectively enclose roof storage compartment 24.

Convertible roof 12 includes a first roof section 30, a second roof section 32, a third roof section 34 and a retraction mechanism 36. Convertible roof 12 is movable from a raised position depicted in FIGS. 1–3 through intermediate positions such as the position depicted in FIGS. 4 and 5 to a stowed position depicted in FIG. 6. Each of the first, second and third roof sections are substantially rigid members interconnected to one another by retraction mechanism 36.

First roof section 30 is preferably a substantially rigid panel having an outer surface 40, an inner surface 42, a leading edge 44 and a trailing edge 46. First roof section 30 includes a conventional latching mechanism (not shown) which is disengageably attachable with header 22 when convertible roof 12 is in the raised position. Leading edge 44 sealingly engages header 22 when the latching mechanism secures first roof section 30 to windshield 20.

Second roof section 32 includes an outer surface 48, an inner surface 50, a leading edge 52 and a trailing edge 54. Leading edge 52 sealingly engages trailing edge 46 of first roof section 30 when convertible roof 12 is in the raised position.

Third roof section 34 includes an outer surface 56, an inner surface 58, a leading edge 60 and a trailing edge 62. Leading edge 60 is sealingly engaged with trailing edge 54 of second roof section 32 when convertible roof 12 is in the raised position. Trailing edge 62 includes lip seals (not shown) which sealingly engage tonneau cover 26 when third roof section 34 is in the raised position. Third roof section 34 also includes a transparent window 63. Preferably, window 63 is a three-demensionally curved glass member matching the contour of the rear portion of third roof section 34. Alternatively, window 63 may be a flexible translucent panel constructed from PVC or other suitable material.

Retraction mechanism 36 is mounted in a cavity 64 of roof storage compartment 24. Retraction mechanism 36 includes a pair of actuation assemblies 66 mounted near each outboard edge of vehicle 10. Because each of actuation assemblies 66 are substantially identical mirror images of one another, only the passenger side actuation assembly will be depicted and described in greater detail.

Actuation assembly 66 includes a linkage assembly 68 coupled to an actuator 70. Actuator 70 is presently depicted as a hydraulic cylinder coupled to linkage assembly 68. It should be appreciated that actuator 70 may alternately be constructed as an electric motor, a pneumatic cylinder, or any suitable power source for driving linkage assembly 68. Actuator 70 is coupled to vehicle 10 and positioned within cavity 64 of roof storage compartment 24.

Linkage assembly 68 includes a first subassembly 72 interconnecting third roof section 34 and body 14. Linkage assembly 68 also includes a second subassembly 74 interconnecting first roof section 30 and second roof section 32 with body 14. A control link 76 interconnects first subassembly 72 with second subassembly 74. It should be appreciated that if control link 76 were removed, third roof section 34 would articulate independently from first roof section 30 and second roof section 32. Accordingly, control link 76 allows the use of a single actuator 70 to drive each roof section in a coordinated manner relative to one another between the raised and stowed positions.

An alternate embodiment exists by removing control link 76 and coupling actuator 70 to first subassembly 72 and a second actuator (not shown) to second subassembly 74. A control mechanism (not shown) is capable of sensing the position of first subassembly 72 and second subassembly 74 to assure that convertible roof 12 may be moved between the raised position and the stowed position without causing binding or interference between the roof sections or any other vehicle components.

With reference to the embodiment including control link 76 as shown in the Figures, first subassembly 72 includes a first link 78, a second link 80 and a third link 82. First link 78 is fixed to third roof section 34. Second link 80 and third link 82 each have one end pivotally coupled to a bracket 84 mounted on body 14. Second link 80 and third link 82 each include an opposite end pivotally coupled to first link 78. One end of control link 76 is pivotally coupled to a mid-portion of second link 80.

Second subassembly 74 includes a hinge assembly 86 including a first clasp 88 coupled to first roof section 30 and a second clasp 90 mounted to second roof section 32. First clasp 88 is pivotally coupled to second clasp 90 by hinge pin 92.

Second subassembly 74 also includes a first link 94, a second link 96, a third link 98 and a fourth link 100. One end of first link 94 is pivotally coupled to first clasp 88. The opposite end of first link 94 is pivotally coupled to one end of third link 98. The opposite end of third link 98 is pivotally coupled to one end of link 100. The opposite end of link 100 is mounted to second roof section 32. One end of link 96 is pivotally coupled to a bracket 102 which is fixed to second roof section 32. The opposite end of link 96 is pivotally coupled to bracket 84.

As mentioned earlier, one end of control link 76 is coupled to a mid-portion of third link 82 of first subassembly 72. A mid-portion of control link 76 is pivotally coupled to a mid-portion of second link 96. The opposite end of control link 76 is pivotally coupled to the ends of first link 94 and third link 98.

Tonneau cover 26 is pivotally coupled to body 14 at a hinge 106. Tonneau cover 26 is preferably operated by a separate control system (not shown) capable of moving tonneau cover 26 from a closed position depicted in FIG. 6 to an open position (not shown). The control system functions to coordinate the movement of tonneau cover 26 with convertible roof 12 such that roof storage compartment 24 is accessible when moving convertible roof 12 between the raised and stowed positions. Alternately, tonneau cover 26 may be manually operated to selectively latch to body 14. As such, roof storage compartment 24 is selectively enclosed or accessible. The manually operated tonneau cover 26 includes a biasing mechanism (not shown) for urging tonneau cover 26 toward the opened position.

Figure 6:
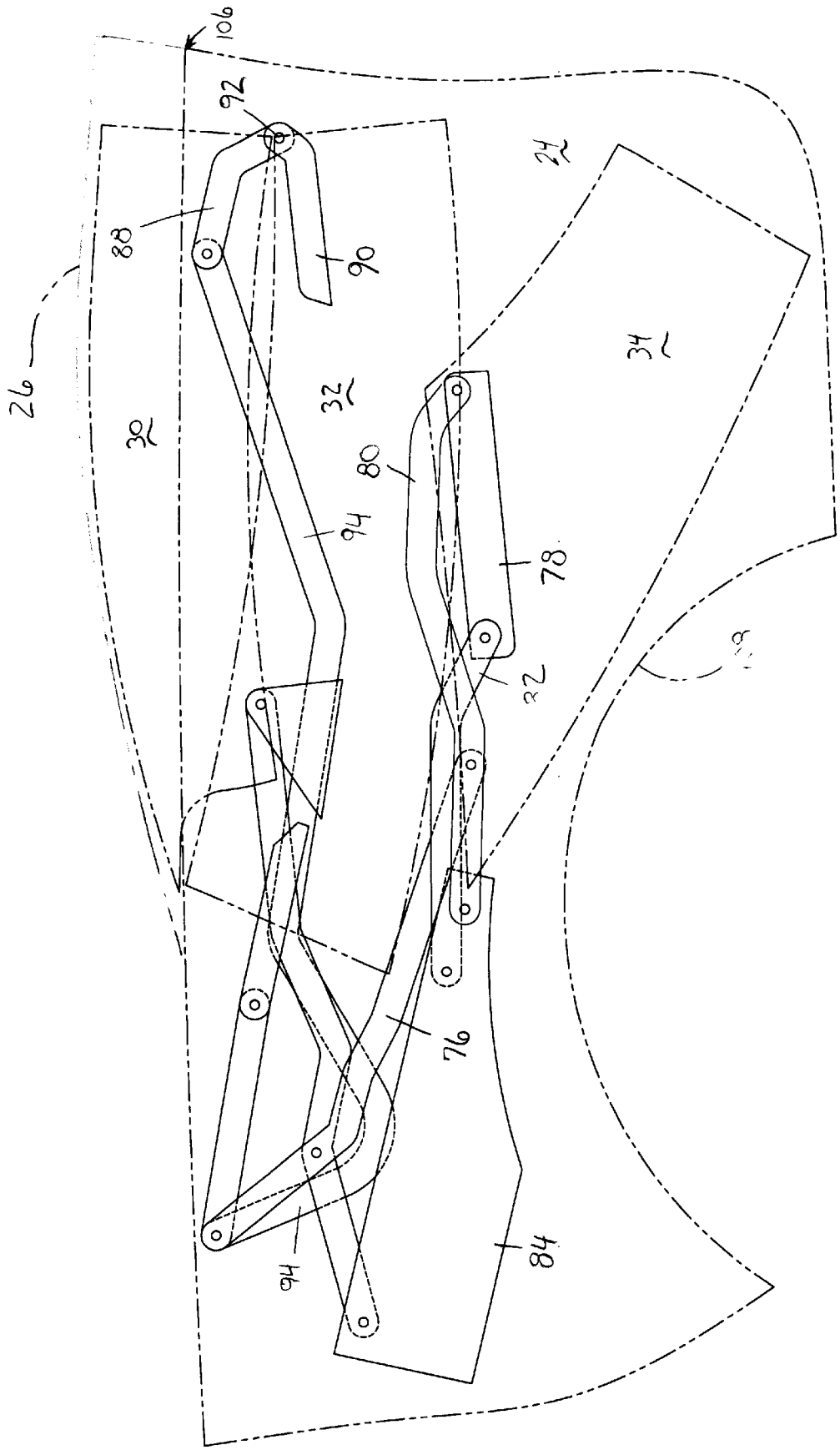
FIG. 6 is a partial side elevational view depicting the convertible roof of the present invention in a stowed position.

An alternate vehicle embodiment does not include a tonneau cover 26. As most clearly shown in FIG. 6, first roof section 30 is oriented in a stowed position such that outer surface 40 is exposed. Accordingly, convertible roof 12 is a self-covering assembly that does not require a tonneau cover to be aesthetically pleasing when the top is in the stowed position. FIG. 6 depicts the uppermost portion of first roof section 30 as protruding above an upper surface of body 14. However, it should be appreciated that the edges of first roof section 30 taper downwardly toward the edges of the vehicle. As such, outer surface 40 of first roof section 30 may be positioned substantially tangent to the upper surface of body 14 when convertible roof 12 is in the stowed position.

Figure 4:
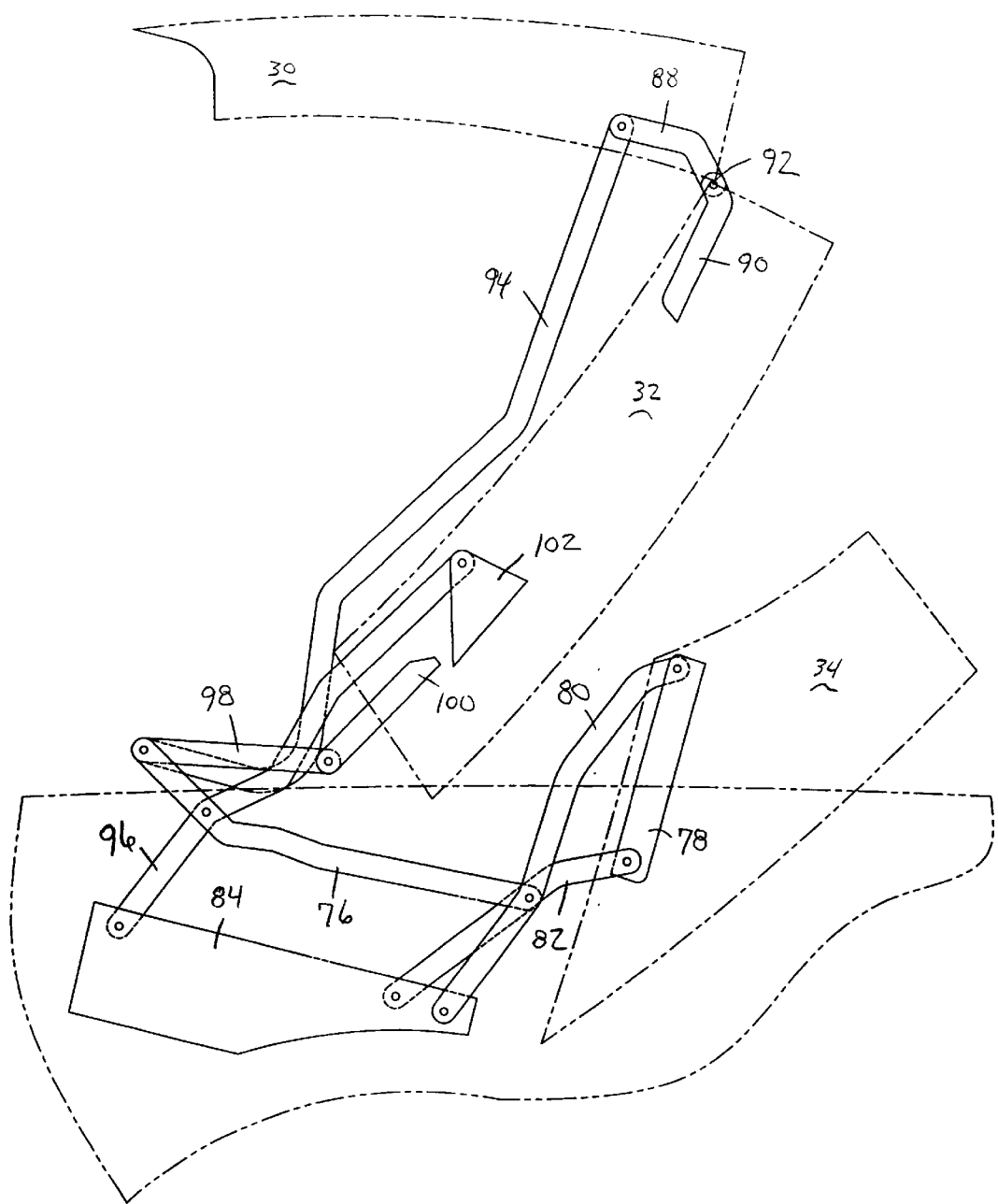
FIG. 4 is a partial side elevational view depicting the convertible roof of the present invention in an intermediate position.
Figure 5:
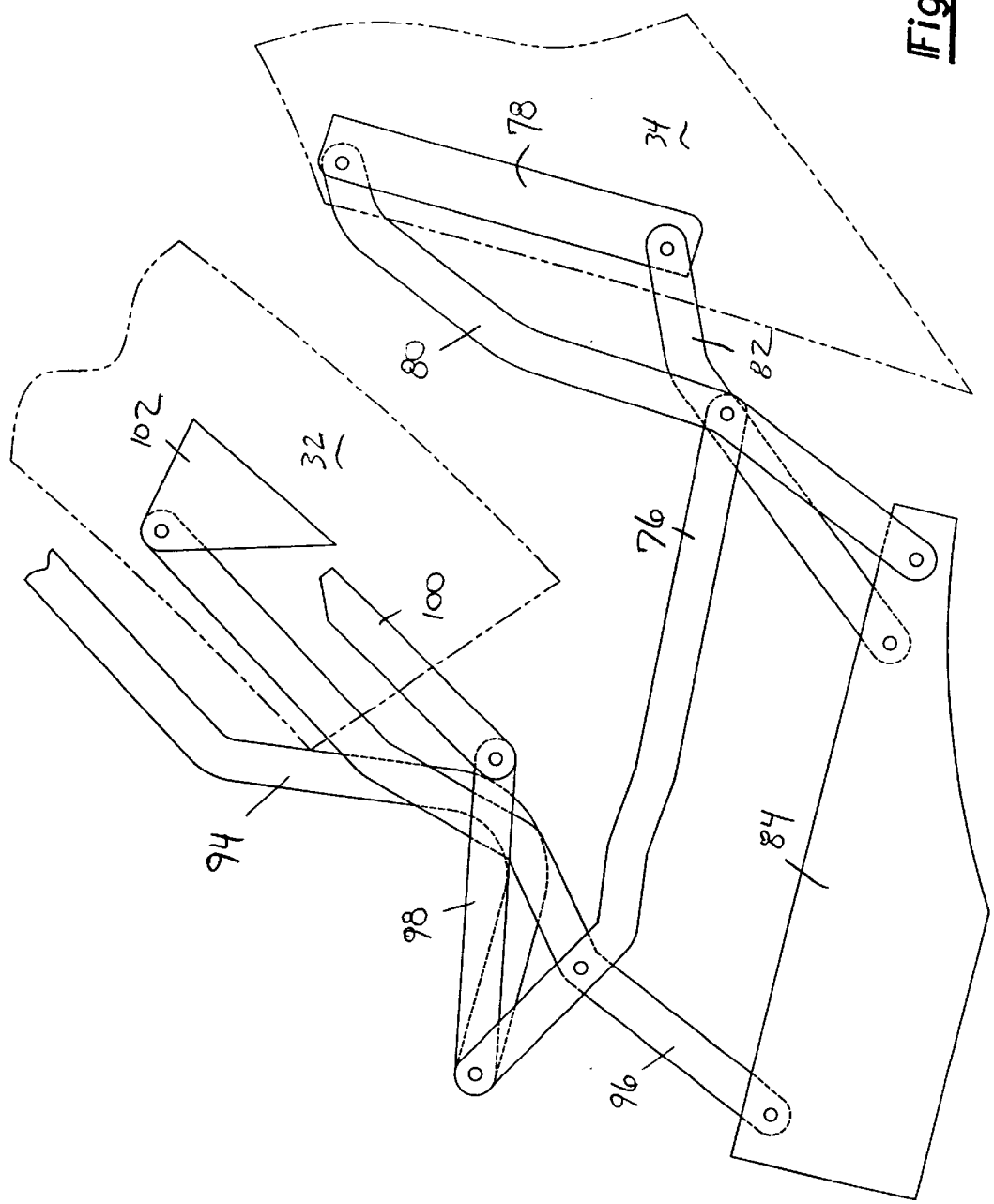
FIG. 5 is a partial enlarged side elevational view of the convertible roof of the present invention in the intermediate position of FIG. 4.

In operation, convertible roof 12 is moved from the raised position depicted in FIGS. 1–3, through intermediate positions such as the one depicted in FIGS. 4 and 5, to the stowed position depicted in FIG. 6 by first unlatching first roof section 30 from header 22. An operator engages a switch (not shown) located in passenger compartment 16. The switch is connected electrically to actuator 70 to control the operation of retraction mechanism 36. When convertible roof 12 is used in conjunction with a manually operated tonneau cover, a simple switch may be implemented without the need for sophisticated electronic controls, proximity switches and/or sensors. However, the convertible roof of the present invention may be operated in conjunction with a power operated tonneau cover as previously discussed. In this case, the switch is connected electrically to an electronic control unit (not shown), such as a microprocessor, that controls the operation of retraction mechanism 36. The electronic control unit sends a signal to operate actuator 70 and an actuator coupled to tonneau cover 26. Devices such as limit switches, sensors and potentiometers are coupled to body 14, tonneau cover 26 and convertible roof 12 to inform the electronic control unit of the position of tonneau cover 26 and roof 12 to assure that convertible roof 12 does not interfere with tonneau cover 26 during movement between the stowed or raised positions.

Actuator 70 is pivotally coupled to and powered to drive third link 82 of first subassembly 72 to move convertible roof 12 between the raised and stowed positions. As first subassembly 72 articulates, force is transferred through control link 76 to second subassembly 74. The force produced is sufficient to cause first roof section 30 and second roof section 32 to move. As depicted in FIG. 4, first roof section 30 pivots relative to second roof section 32 in a typical clam shell manner such that inner surface 42 of first roof section 30 approaches inner surface 50 of second roof section 32. Second subassembly 74 also begins to rearwardly translate and rotate second roof section 32 toward the stowed position. Third roof section 34 begins to enter roof storage compartment 24. One skilled in the art will appreciate that actuator 70 may be coupled to linkage assembly 68 at a number of different locations without department from the scope of the present invention.

With reference to FIG. 6, convertible roof 12 is shown in the stowed position. In the stowed position, first roof section 30 and second roof section 32 are each positioned in a substantially horizontal manner within roof storage compartment 24. Third roof section 34 is recessed within roof storage compartment 24 such that a substantial portion of third roof section 34 is positioned below the top of a wheel well 108. Third roof section 34 rotates over 180 degrees when traveling between the raised position and the stowed position. Outer surface 40 of first roof section 30 is positioned beneath tonneau cover 26. Outer surface 48 of second roof section 32 is positioned to face inner surface 58 of third roof section 34. Leading edge 44 of first roof section 30 is positioned rearward of trailing edge 54 of second roof section 32. To achieve a minimal packaging envelope, first roof section 30 is folded toward second roof section 32. First and second roof sections are nested into close proximity to third roof section 34.

As shown in FIGS. 2 and 6, convertible roof 12 is packaged within roof storage area 24 separate from miscellaneous storage area 18. A deck lid (not shown) is coupled to body 14 to allow access to miscellaneous storage area 18 without accessing roof storage area 24. Therefore, convertible roof 12 does not obstruct access to miscellaneous storage area 18 while positioned in either the raised or stowed position.

While it is apparent that the embodiments of the invention disclosed are well calculated to provide the advantages and features above stated, it will be appreciated that the invention is susceptible to modification, variation and change without departing from the proper scope or fair meaning of the subsequent claims. For example, the convertible roof may include extra roof sections or additional members to the retraction mechanism. A soft top roof may also be used with the present device. While the system was described to include hydraulic actuators, an electric motor or other suitable power transfer mechanism may alternately be employed to deploy convertible roof 12. Furthermore, the convertible roof can alternately be stored in a miscellaneous storage area such as a trunk of a conventional sedan or coupe rather than in a roof storage compartment as presently disclosed. Other materials and dimensions can be substituted for those disclosed. It is intended by the following claims to cover these and any other departures from the disclosed embodiments which fall within the true spirit of this invention.

What is claimed is:

1. A convertible roof for a vehicle, said convertible roof comprising:
   a forward substantially rigid roof section movable from a raised position to a stowed position;
   a rearward substantially rigid roof section movable from a raised position to a stowed position, wherein said rearward roof section rotates more than 180 degrees when moving between said raised position and said stowed position.

2. The convertible roof of claim 1 further including at least an intermediate roof section movably coupled to said forward root section.

3. The convertible roof of claim 2 further including a hinge pivotally interconnecting said forward and said intermediate roof sections.

4. The convertible roof of claim 3 wherein an inner surface of said forward roof section faces an inner surface of said intermediate roof section when said convertible roof is in said stowed position.

5. The convertible roof of claim 4 wherein an inner surface of said rearward roof section faces an outer surface of said intermediate roof section when said convertible roof is in said stowed position.

6. The convertible roof of claim 1 further including a pair of links having first ends pivotally coupled to said rearward roof section and second ends adapted to pivotally mount to the vehicle.

7. The convertible roof of claim 6 further including a balance link having a first end pivotally coupled to said intermediate roof section and a second end adapted to pivotally mount to the vehicle.

8. The convertible roof of claim 1 where said rearward roof section includes a three-dimensionally curved window.

9. A convertible roof for a vehicle, said convertible roof comprising:
   a first substantially rigid roof section movable from a raised position to a stowed position;
   a second substantially rigid roof section movable from a raised position to a stowed position;
   a hinge pivotally interconnecting said first and second roof sections;
   at least a third roof section movable from a raised position to a stowed position;
   a first link having a first end pivotally coupled to said second roof section, wherein said second roof section is positioned between said first roof section and said third roof section when said convertible roof is in said raised position, wherein a second end of said first link is adapted to be pivotally coupled to the vehicle; and
   second and third links each having a first end pivotally coupled to said third roof section and a second end adapted to be pivotally coupled to the vehicle.

10. The convertible roof of claim 9 further including a control link interconnecting said first link and one of said second link and said third links.

11. The convertible roof of claim 10 further including a fourth link interconnecting said control link and said first roof section.

12. The convertible roof of claim 9 wherein said first link, said second link and said third link each include pivot points spaced apart from one another in a fore-and-aft direction, wherein each of said pivot points is adapted to be pivotally coupled to the vehicle.

13. A vehicle comprising:
a body having a rear wheel well; and
a convertible roof movable in at least a fore-and-aft direction between a raised position and a stowed position, wherein said convertible roof includes at least, first, second and third roof panels, wherein a leading edge of at least one of said roof panels is positioned below a horizontal plane defined by top of said wheel well when said convertible root is in said stowed position.

14. A vehicle comprising:
a body having a rear wheel well; and
a convertible roof movable in at least a fore-and-aft direction between a raised position and a stowed position, wherein said convertible roof includes at least, first, second and third roof panels, wherein a substantial portion of at least one of said roof panels is positioned below a horizontal plane defined by a top of said wheel well when said convertible roof is in said stowed position, wherein said first and second roof panels are hingedly coupled to one another.

15. A vehicle comprising:
a body having a rear wheel well; and
a convertible roof movable in at least a fore-and-aft direction between a raised position and a stowed position, wherein said convertible roof includes at least, first, second and third roof panels, wherein a substantial portion of at least one of said roof panels is positioned below a horizontal plane defined by a top of said wheel well when said convertible roof is in said stowed position, wherein said first, second and third panels are substantially horizontally positioned and stacked atop one another when said convertible roof is in said stowed position.

16. The vehicle of claim 15 wherein said body defines a passenger compartment and a roof storage compartment separated from said passenger compartment, wherein said convertible roof is positioned within roof storage compartment when in said stowed position.

17. The vehicle of claim 16 including a tonneau cover selectively enclosing said roof storage compartment.

18. A method of operating a convertible roof comprising:
moving forward and rearward substantially rigid roof sections from a raised position to a stowed position; and
rotating said rearward roof section more than one hundred and eighty degrees when moving between said raised and said stowed positions.

19. The method of claim 18 further comprising moving at least one intermediate roof section between said raised and stowed positions.

20. The method of claims 19 further comprising positioning an inner surface of said forward roof section to face an inner surface of said intermediate roof section when in said stowed position.

* * * * *

UNITED STATES PATENT AND TRADEMARK OFFICE
CERTIFICATE OF CORRECTION

PATENT NO. : 6,695,386 B1
DATED : February 24, 2004
INVENTOR(S) : Michael T. Willard It is certified that error appears in the above-identified patent and that said Letters Patent is hereby corrected as shown below:

Title page,
Item [56], References Cited, U.S. PATENT DOCUMENTS, "Schutte t al." should be -- Schutt et al. --.
OTHER PUBLICATIONS,
"Ford Focus Cabridet" reference, "Reteractable" should be -- Retractable --.
"Isuzu VX-02" reference, "thr" should be -- the --.
"Nissan 3000" should be -- Nissan 300 --.
"Peugeot 106 Spider" reference, "ahve" should be -- have --.
"Peugeot 3" reference, "diling" should be -- filing --.

Column 5,
Line 33, "department" should be -- departing --.

Column 6,
Line 43, "where" should be -- wherein --.

Signed and Sealed this

Third Day of May, 2005

JON W. DUDAS
*Director of the United States Patent and Trademark Office*